United States Patent [19]
Furukawa

[11] Patent Number: 5,542,958
[45] Date of Patent: Aug. 6, 1996

[54] METHOD FOR MANUFACTURING A HYDROGEN ABSORBING ALLOY ELECTRODE

[75] Inventor: Jun Furukawa, Iwaki, Japan

[73] Assignee: Furukawa Denchi Kabushiki Kaisha, Kanagawa, Japan

[21] Appl. No.: 314,328

[22] Filed: Sep. 28, 1994

[30] Foreign Application Priority Data

Oct. 13, 1993 [JP] Japan .................................. 5-255739

[51] Int. Cl.$^6$ .................................................. H01M 6/00
[52] U.S. Cl. .......................... 29/623.1; 429/101; 429/59; 429/94; 429/241; 429/242
[58] Field of Search ............................ 429/101, 241, 429/242, 94, 59; 29/623.1

[56] References Cited

U.S. PATENT DOCUMENTS 5,053,292  10/1991  Hasebe et al. ........................... 429/101

*Primary Examiner*—Bruce F. Bell
*Attorney, Agent, or Firm*—Frishauf, Holtz, Goodman, Langer & Chick

[57] ABSTRACT

A method for manufacturing a hydrogen absorbing alloy including, comprising the steps of (a) causing a punched metal sheet to run in a slurry of hydrogen absorbing alloy powder, to thereby cause the slurry to be adhered onto the punched metal sheet, the punched metal sheet having a plurality of apertures arranged in a staggered fashion; (b) drying the punched metal sheet on which the slurry has been adhered, to thereby obtain an electrode sheet; (c) cutting the electrode sheet into electrode sheet fragments, each electrode sheet fragment having a first axis and a second axis perpendicular to the first axis, and each electrode sheet fragment having aperture-formed portions and aperture-non-formed portions therein; (d) rolling an electrode sheet fragment in a rolling direction parallel to the first axis of the electrode sheet fragment, the electrode sheet fragment having an aperture array arrangement such that any given line running along the electrode sheet fragment parallel to the second axis of the electrode sheet fragment will intersect aperture-formed portions therein; and (e) coiling the thus rolled electrode sheet fragment in a coiling direction which is the same as the rolling direction.

20 Claims, 3 Drawing Sheets

5,542,958

METHOD FOR MANUFACTURING A HYDROGEN ABSORBING ALLOY ELECTRODE

Background of the Invention

1. Field of the Invention

The present invention relates to a method for manufacturing a hydrogen absorbing alloy electrode, and more particularly, to a method for manufacturing a hydrogen absorbing alloy electrode for use in a cylindrical secondary cell.

1. Description of Related Art

A nickel-metal hydride secondary cell, which has a high energy storage capacity, typically comprises a negative electrode made of hydrogen absorbing alloy for absorbing and releasing hydrogen (more generally, a negative electrode active material), and a positive electrode comprised of an electrically conductive base member which carries nickel monoxide (more generally, a positive electrode active material). These electrodes are disposed in alkali electrolyte. A cylindrical type of nickel-metal hydride secondary cell comprises a cylindrical enclosure, and a power generation element accommodated therein, the enclosure having an auxiliary function of a negative electrode terminal. The power generation element, comprised of a positive electrode which is coiled in a spiral form together with a negative electrode piled on the positive electrode via a separator, is disposed on an insulating plate which is in turn disposed on the bottom of the cylindrical enclosure. The separator carries alkali electrolyte. Further, a cap, having an auxiliary function of a positive electrode terminal, is disposed on the power generation element through an insulating plate, etc. Preferably, the positive and negative electrodes are so constructed as to provide a large energy storage density, and prevent separation of the positive electrode active material and the hydrogen absorbing alloy therefrom when these electrodes are coiled.

From this point of view, generally used is a negative electrode sheet which is fabricated by applying a slurry of hydrogen absorbing alloy onto an electrically conductive sheet such as a punched metal sheet, and by drying the sheet to which the slurry has been applied. This negative electrode sheet is cut into negative electrodes. The punched metal sheet is fabricated by forming a plurality of apertures in a nickel sheet or by effecting nickel plating or nickel vacuum evaporation onto a sheet formed with a plurality of apertures, for instance. The alloy slurry is prepared with use of hydrogen absorbing alloy powder, thickener such as methylcellulose, and water obtained by ion-exchange.

In order to satisfy requirements such that the punched metal sheet must have suitable flexibility, electric conductivity, etc., the aperture rate, i.e., the ratio of the total area of the apertures to the total area of the sheet, must fall within an appropriate range. Once the aperture rate is determined, a suitable number of apertures and a suitable aperture diameter, i..e., a suitable aperture array arrangement in the punched metal sheet is also determined. Generally adopted is a staggered arrangement where the apertures are arranged in a zigzag fashion, so that lines connecting the center points of adjacent three apertures constitute an equilateral triangle, for instance.

Further, the apertures are typically arranged such that, when the punched metal sheet is projected onto an imaginary plane which extends perpendicularly to the sheet and which contains a sheet axis extending in the longitudinal or width direction of the sheet, projected apertures overlap one another, whereas projected aperture-non-formed portions of the sheet are present between adjacent projected apertures when the sheet is projected onto another imaginary plane extending perpendicularly to the sheet and containing the other axis (hereinafter referred to as the second axis) of the sheet.

However, when a negative electrode sheet fabricated from a punched metal sheet having the aforementioned aperture arrangement is coiled, especially, in the direction of the second axis, the thus coiled negative electrode sheet is sometimes cracked along the second axis direction at those locations in the second axis direction at which the aperture-non-formed portions are present. It can be considered that this results from poor bending strength of the negative electrode at its aperture-non-formed portions in which a smaller amount of the hydrogen absorbing alloy powder is filled than that of the powder filled in its aperture-formed portions, so that the stress produced In the negative electrode during the coiling of the electrode concentrates at the aperture-non-formed portions concerned. If a crack is formed in the negative electrode, a layer of the alloy powder adhered to the surface of the negative electrode breaks through the separator to be brought into contact with the positive electrode, resulting in a short-circuited failure of a secondary cell accommodating therein these electrodes.

SUMMARY OF THE INVENTION

The object of the present invention is to provide a method for manufacturing a hydrogen absorbing alloy electrode which is capable of suppressing occurrences of cracks when the electrode is coiled.

According to the present invention, a method for manufacturing a hydrogen absorbing alloy electrode comprises the steps of: (a) causing a punched metal sheet to run in a slurry of hydrogen absorbing alloy powder, to thereby cause the slurry to be adhered onto the punched metal sheet, the punched metal sheet being formed with a plurality of apertures which are arranged* in a staggered fashion; (b) drying the punched metal sheet on which the slurry has been adhered, to thereby obtain an electrode sheet; (c) cutting the electrode sheet into electrode sheet fragments; (d) rolling an electrode sheet fragment in such a rolling direction that aperture-formed portions of the electrode sheet fragment are always present during the rolling as viewed from a direction perpendicular to the rolling direction; and (e) coiling the thus rolled electrode sheet fragment in the same direction as the rolling direction, to thereby obtain a hydrogen absorbing alloy electrode.

The present invention is advantageous in that the electrode sheet fragment is rolled in such a direction that aperture-formed portions of the electrode sheet fragment are always present during the rolling as viewed from the direction perpendicular to the rolling direction, and the sheet fragment is coiled in the same direction as the rolling direction, so that the electrode sheet fragment is prevented from being cracked during the coiling, to thereby obtain a hydrogen absorbing alloy electrode free from cracks. This makes it possible to prevent a short-circuited failure in a cylindrical type of a secondary cell which accommodates therein the hydrogen absorbing alloy electrode.

DETAILED DESCRIPTION

Figure 1:
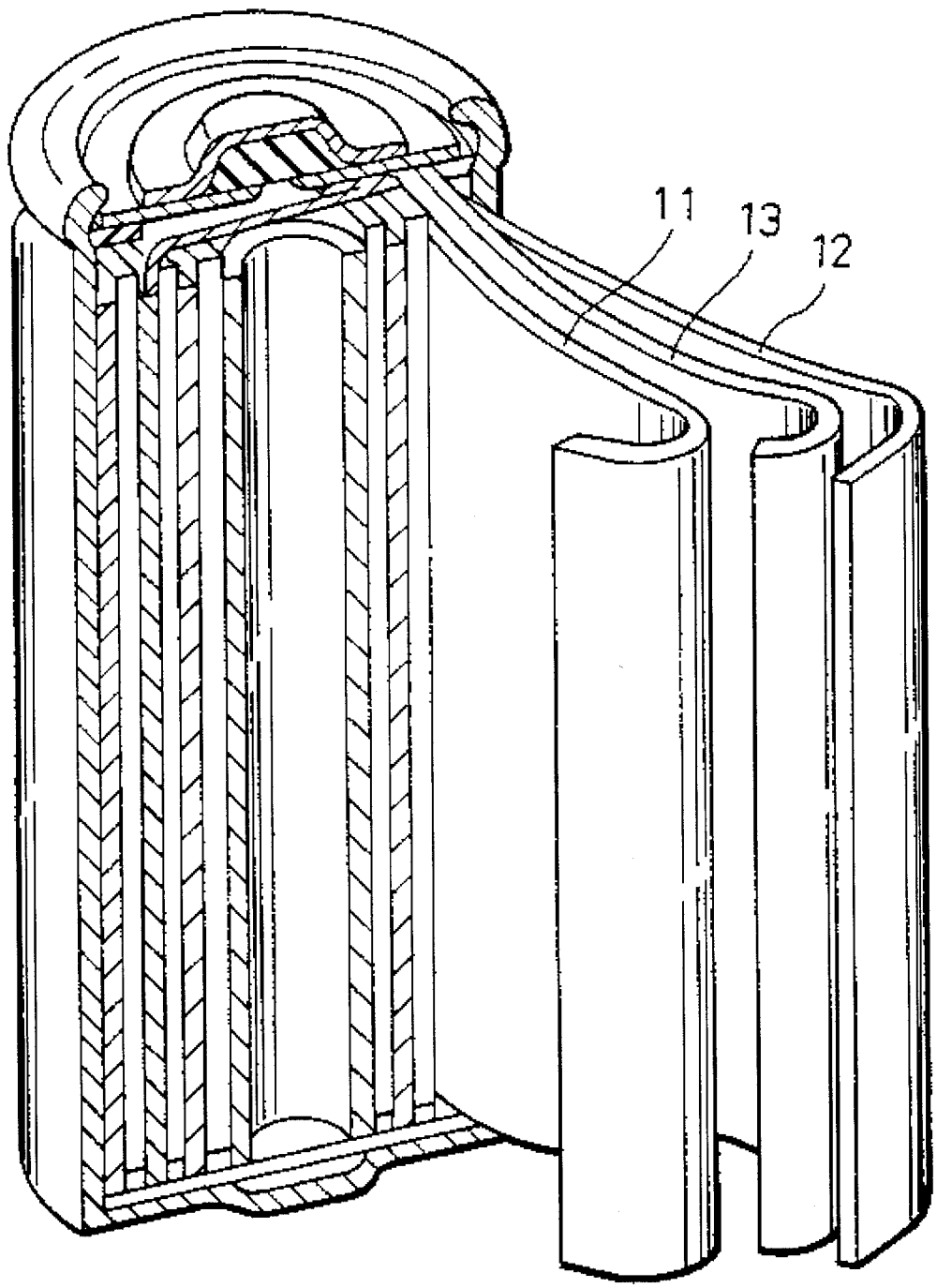
FIG. 1 is a perspective view, showing partly in cross section, of a nickel-metal hydride secondary cell of a cylindrical type which accommodates a hydrogen absorbing alloy electrode fabricated by a method according to an embodiment of the present invention, with the hydrogen absorbing alloy electrode, a separator, and a positive electrode shown in such a manner that these elements are partly uncoiled.

Referring to FIG. 1, a nickel-metal hydride secondary cell of a cylindrical type comprises a nickel positive electrode 11, and a hydrogen absorbing alloy negative electrode 12, these electrodes being coiled in a spiral form together with a separator 13 interposed therebetween, and being received in the cell. The negative electrode 12 is fabricated by a manufacturing method according to an embodiment of the present invention in a manner mentioned below.

Figure 2:
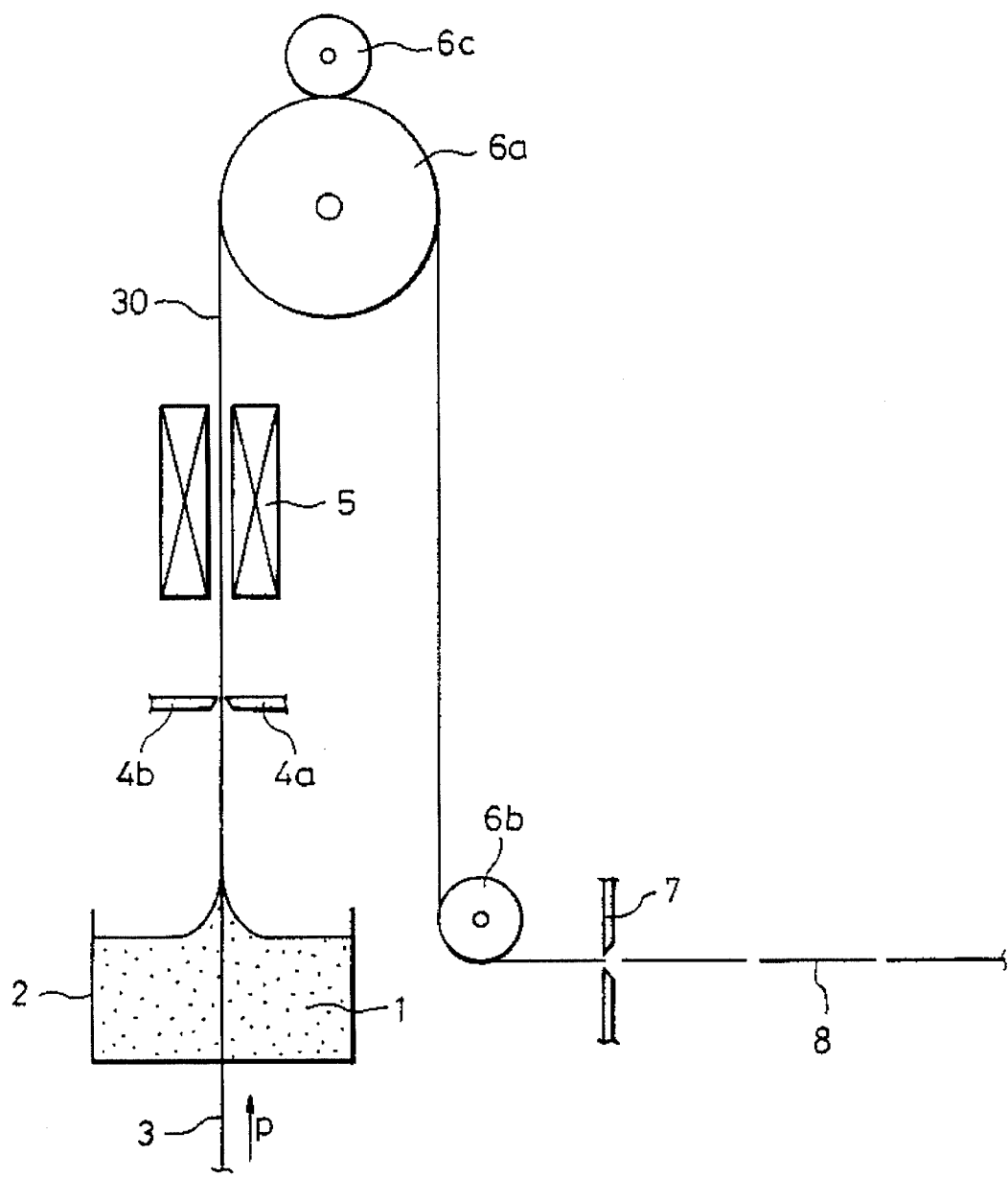
FIG. 2 is a schematic view showing a manufacturing process of electrode sheet fragments for use in the hydrogen absorbing alloy electrode shown in FIG. 1.
Figure 3:
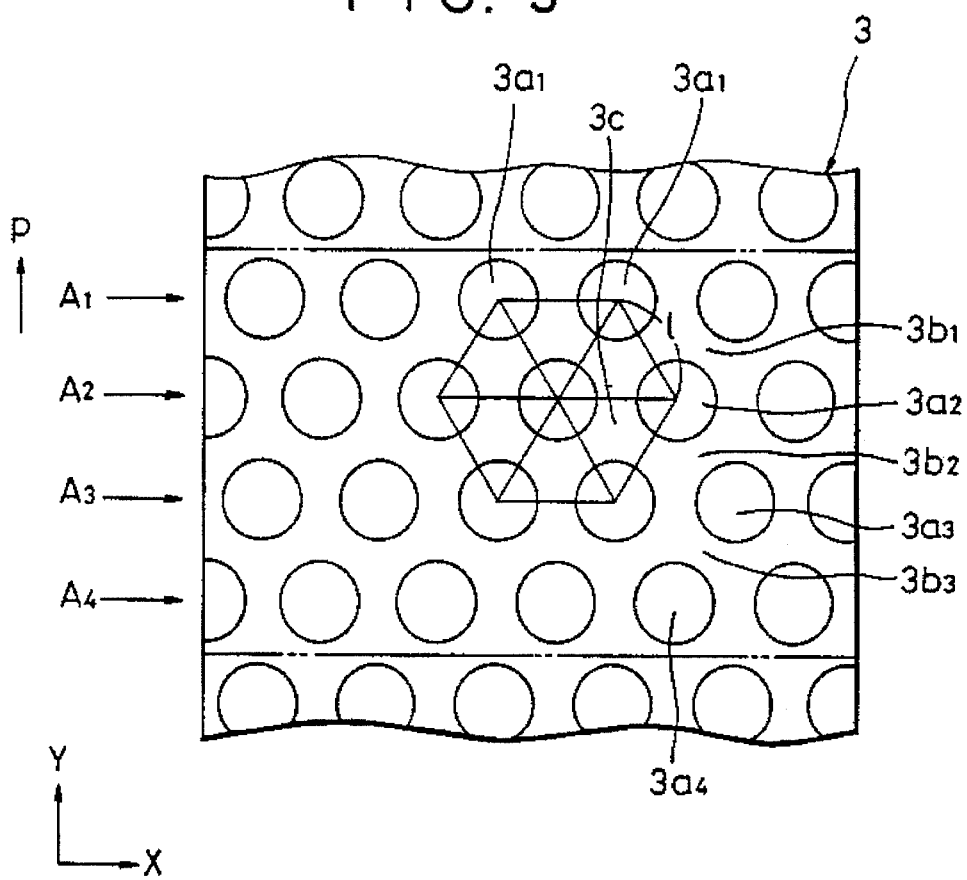
FIG. 3 is a fragmentary plan view showing a punched metal sheet from which the electrode sheet fragment shown in FIG. 2 is obtained.

First, a punched metal sheet which is denoted by reference numeral 3 in FIGS. 2 and 3 is prepared. As shown in FIG. 3, the punched metal sheet is comprised of a nickel sheet, for example, formed with a plurality of apertures 3a. The number of apertures 3a to be formed in the entire of the sheet and the aperture diameter are selected so that a desired aperture rate is obtained. In FIG. 3, suffixes "1" to "4" following reference numeral 3a denote $A_1$'th to $A_4$'th aperture columns as viewed in the Y-axis direction in FIG. 3, respectively.

In the punched metal sheet 3, the plurality of apertures 3a are, as a whole, arranged in a staggered fashion. More specifically, the center points of a set of apertures which belong to the same column indicated by the same suffix are arranged at intervals on the same straight line, the spatial interval "1" being larger than the aperture diameter. The center points of adjacent two apertures 3a located at adjacent columns are shifted from each other in the X-axis direction by one-half of the aperture formation spatial interval "1". Thus, three lines which connect the center points of adjacent three apertures 3a constitute an equilateral triangle.

In FIG. 3, reference numeral 3b denotes aperture-non-formed portions of the sheet each of which is present between the apertures 3a concerned. Each of suffixes "1" to "3" following reference numeral 3b denotes the aperture-non-formed portion which continuously extends in the X-axis direction over the entire width of the punched metal sheet 3 between a set of apertures 3a which belong to a corresponding one of the $A_1$'th to $A_3$'th columns and a set of apertures 3a which belong to the next column. Further, reference numeral 3c denotes an aperture-non-formed portions each extending in the Y-axis direction over a limited length.

Next, a predetermined amount of hydrogen absorbing alloy powder having a predetermined particle diameter is dispersed in ion-exchanged or distilled water together with thickener such as carboxymethylcellulose, to thereby prepare a slurry of hydrogen absorbing alloy powder of a predetermined concentration. This alloy powder slurry is stored in a slurry box 1 of an electrode sheet manufacturing apparatus shown in FIG. 2.

In this apparatus, the punched metal sheet 3 is disposed along the illustrated sheet running path extending from the slurry box 1 to a cutter 7. Next, drive rollers 6a and 6b are caused to rotate intermittently, so that the punched metal sheet 3 runs substantially continually In the alloy powder slurry stored in the slurry box 1 in the direction shown by the arrow "p" corresponding to the Y-axis direction shown in FIG. 3.

As a result of the running of the punched metal sheet 3, an adhered slurry layer which covers the sheet 3 is formed on the opposite sides of the sheet 3. A larger amount of the slurry is adhered to the aperture-formed portions of the sheet 3, as compared with that adhered to the aperture-non-formed portions.

Then, the punched metal sheet 3 to which the slurry layer has been adhered passes between a pair of doctor blades 4a and 4b disposed above the slurry box 1. During this process, any surplus of the slurry is removed, so that an adhered slurry layer having a uniform thickness is formed on the opposite sides of the punched metal sheet 3.

Next, the punched metal sheet 3 formed with the uniform slurry layer passes through a drying furnace 5. During this process, the adhered slurry layer is dried. The resultant negative electrode sheet 30 has substantially the same aperture array arrangement as that of the punched metal sheet 3.

Further, the negative electrode sheet 30 passes the rollers 6a, 6c and the roller 6b to reach the cutter 7. When the sheet 30 further runs so that the tip end of the sheet projects beyond the cutter 7 by a predetermined length, the drive rollers 6a and 6b are caused to stop rotating, and the cutter 7 is operated to cut off a sheet fragment 8 of a predetermined length from the sheet 30. At this time, the negative electrode sheet 30 is cut in the X-axis direction which is perpendicular to the sheet running direction, as shown by two-dotted chain lines in FIG. 3. Thereafter, the cutter 7 is operated to obtain a sheet fragment 8 each time the sheet 30 is fed by the predetermined length. As illustrated, by way of example, by the two-dotted chain lines in FIG. 3, each sheet fragment 8 has, eg., four aperture columns corresponding to the $A_1$'th to $A_4$'th aperture columns. The production of the sheet fragments by means of the apparatus shown In FIG. 2 is high in efficiency.

Further, each sheet fragment 8 is subject to a rolling process. In the rolling process, the sheet fragment 8 is rolled in the X-axis direction shown in FIG. 3 by means of a rolling mill (not shown). The thus rolled sheet fragment 8 slightly warps in the rolling direction (X-axis direction), so that it becomes easy to be coiled in the X-axis direction and around the Y-axis perpendicular to the rolling direction. The apertures 3a of the sheet fragment 8 subjected to the rolling process become an elliptical shape which is elongated in the rolling direction.

Figure 4:
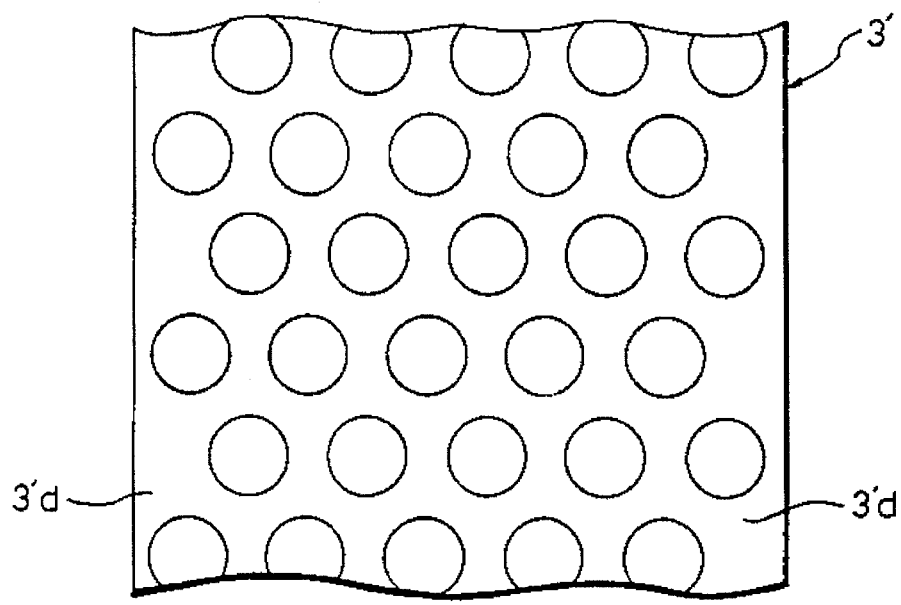
FIG. 4 is a view, similar to FIG. 3, showing a punched metal sheet provided at its opposite sides with ear portions.

In the meantime, when a sheet fragment (not shown), obtained from a punched metal sheet 3' shown in FIG. 4 and having ear portions 3'd at its opposite sides, is rolled in the Y-axis direction shown in FIG. 3, wrinkles of a wave pattern sometimes appear at the aperture-non-formed portions of the sheet because an amount of rolling at the aperture-non-formed portions is greater than that at the ear portions 3'd. On the other hand, when the same sheet fragment is rolled in the X-axis direction, no substantial wave pattern appears so that a flattened surface of the sheet fragment can be obtained.

Next, the rolled sheet fragment 8 and a positive electrode sheet (corresponding to the electrode 11 shown in FIG. 1) fabricated separately therefrom are piled on one another via a separator 12, and the whole of these elements is coiled into a spiral form to thereby obtain a power generator element 11, 13. This element 11, 13 is accommodated in the enclosure of the cylindrical secondary cell, as shown in FIG. 1.

As mentioned above, the sheet fragment 8 is coiled in the X-axis direction which is the same as the rolling direction of the sheet fragment 8. This makes it possible to prevent cracks which tend to occur at the aperture-non-formed portions of the sheet fragment 8 when the fragment is coiled in the Y-axis direction.

More specifically, if the sheet fragment 8 is coiled in the Y-axis direction and around the X-axis, as the coiling process progresses, the aperture-non-formed portions 3b continuously extending in the width direction of the sheet fragment intermittently appear as viewed in the X-axis direction which is perpendicular to the coiling direction. At the aperture-non-formed portions 3b, a filing amount of the hydrogen absorbing alloy powder is relatively small, and hence the bending strength is relative low. Thus, the sheet fragment 8 tends to be cracked when it is coiled at an aperture-non-formed portion which extends over the entire width of the sheet fragment.

On the other hand, if the sheet fragment 8 is coiled in the X-axis direction and around the Y-axis, then the aperture-formed portions continually appear during the progress of the coiling process, as viewed in the y-axis direction perpendicular to the coiling direction. In other word, as the sheet fragment 8 is being coiled, the aperture-non-formed portions 3c, which have a limited length, appear together with the aperture-formed portions 3a, so that the aperture-non-formed portion extending over the entire width of the sheet fragment 8 never appears. Therefore, the aperture-formed portions 3a having a greater bending strength are always present at a location at which the sheet fragment 8 is coiled, whereby occurrences of crack in the sheet fragment 8 can be effectively suppressed by reinforcing effects achieved by the aperture-formed portions 3a.

According to the manufacturing method of the present invention, in the case of manufacturing the hydrogen absorbing alloy electrode 13 by coiling the sheet fragment 8, the sheet fragment 8 is rolled in the X-axis direction prior to the coiling of the sheet fragment 8, as mentioned above, whereby it becomes easy to coil the sheet fragment 8 in the X-axis direction. Then, the sheet fragment 8 is coiled in the X-axis direction which is the same as the rolling direction thereof, so that the aperture-formed portions 3a having an excellent bending strength always appear at a location at which the sheet fragment is coiled, to thereby make it possible to prevent occurrences of cracks in the sheet fragment. As a result, a short-circuited failure in a secondary cell attributable to cracks can be prevented in advance.

Although the positive and negative electrodes 11, 12 arranged in a spiral form have been explained in the above, a plurality of positive electrodes and negative electrodes separated by separators may be alternately laminated.

Example

A punched nickel sheet in which apertures are arranged in a staggered fashion as shown in FIG. 4 was prepared. This sheet is 70 μ thickness and 145 mm width, and has its ear portions 3'd each having a width of approximately 20 mm. The diameter of each aperture is 1.5 mm, the interval at which apertures are formed is approximately 2.3 mm, and the aperture rate is about 38%. Further, aperture-non-formed portions each have a width of 0.8 mm.

Next, a hydrogen absorbing alloy whose composition is represented as $MmNi_{3.3}Co_{1.0}Mn_{0.4}Al_{0.3}$ (where Mm denotes mish metal) was fabricated by arc melting technique, and was crushed to obtain alloy powder having a particle diameter equal to or less than 150 mesh (Tyler sieve). Then, a slurry of alloy powder was prepared, which is composed of 100 parts by weight of ion-exchanged water, 400 parts by weight of alloy powder, 60 parts by weight of nickel powder, 12 parts of polyvinylidene fluoride powder, and 1 part by weight of carboxymethylcellulose. Then, with use of the apparatus shown in FIG. 2, the slurry was adhered to the punched nickel sheet, and dried. Further, the sheet to which the slurry had been adhered was cut in the X-axis direction shown in FIG. 3 to obtain sheet fragments each of which has a length of 290 mm in the X-axis direction, and a width of 145 mm in the Y-axis direction.

Then, each sheet fragment was rolled in the X-axis direction of FIG. 3 at pressure of 8 ton/cm$^2$. Further, polyvinylidene fluoride burned in vacuum or inactive atmosphere was fusion-welded to the rolled sheet fragment.

Moreover, the sheet fragment to which polyvinylidene fluoride had been adhered, and a positive electrode sheet, having 0.55 mm thickness, fabricated with use of $NI(OH)_2$ as active material and piled on the sheet fragment via a nylon separator having 0.18 mm thickness and 65% porousness, were coiled around the Y-axis and in the X-axis direction shown in FIG. 3, to thereby obtain a power generation element having a diameter of 13 mm. During the coiling of the sheet fragment, the sheet fragment was not cracked at its aperture-non-formed portions.

Further, 1000 cylindrical nickel-metal hydride secondary cells were assembled with use of the power generation elements, and the rate of occurrences of short-circuited failure in these cells were tested. The test result indicates that the failure rate is not more than 1%.

Control 1

From a sheet obtained by eliminating ear portions 3'd from the punched nickel sheet used in the foregoing Example, sheet fragments were obtained in the same manner as in the Example. Then, each sheet fragment was rolled in the Y-axis direction of FIG. 3 at pressure of 8 ton/cm$^2$. The rolled sheet fragment, and a positive electrode sheet piled thereon via a nylon separator were coiled around the X-axis and in the Y-axis direction of FIG. 3, to thereby obtain a power generation element having a 13 mm diameter. The sheet fragment was cracked at its aperture-non-formed portion 3c. The rate of occurrences of short-circuited failure in 1000 nickel-metal hydride secondary cells fabricated with use of the power generation elements is 7%.

Control 2

Each of sheet fragments which are the same as that used in Control 1 was rolled in the Y-axis direction of FIG. 3 at pressure of 8 ton/cm$^2$. The thus rolled sheet fragment, and a positive electrode sheet piled thereon via a nylon separator were coiled around the Y-axis and in the X-axis direction of FIG. 3, to obtain a power generation element having a diameter of 13 mm. Because the coiling direction of the sheet fragment is perpendicular to the rolling direction, it was considerably difficult to perform the coiling. The rate of occurrences of short-circuited failure in 1000 nickel-metal hydride secondary cells fabricated with use of the power generation elements is 5%.

Control 3

Each of sheet fragments which are the same as that used in Controls 1 and 2 was rolled in the X-axis direction of FIG.

3 at pressure of 8 ton/cm². The rolled sheet fragment, and a positive electrode sheet piled thereon via a nylon separator were coiled around the X-axis and in the Y-axis direction of FIG. 3, to obtain a power generation element having a diameter of 13 mm. The rate of occurrences of short-circuited failure in 1000 nickel-metal hydride secondary cells fabricated with use of the power generation elements is more than 10%.

What is claimed is:

1. A method for manufacturing a hydrogen absorbing alloy electrode, comprising the steps of:

(a) causing a punched metal sheet, having a plurality of apertures arranged in a staggered fashion, to run in a slurry of hydrogen absorbing alloy powder, to thereby cause the slurry to adhere to the punched metal sheet, and fill the apertures therein;

(b) drying the punched metal sheet on which the slurry has been adhered, to thereby obtain an electrode sheet;

(c) cutting the electrode sheet into electrode sheet fragments, each electrode sheet fragment having a first axis and a second axis perpendicular to the first axis, and each electrode sheet fragment having filled aperture-formed portions and aperture-non-formed portions therein;

(d) rolling an electrode sheet fragment in a rolling direction parallel to the first axis of the electrode sheet fragment, the electrode sheet fragment having an aperture array arrangement such that any given line running along the electrode sheet fragment parallel to the second axis of the electrode sheet fragment will intersect filled aperture-formed portions thereof; and (e) coiling the thus rolled electrode sheet fragment in a coiling direction which is the same as the rolling direction.

2. The method according to claim 1, wherein the aperture array arrangement of the electrode sheet fragment is such that there exist given lines running along the electrode sheet parallel to the first axis of the electrode sheet fragment which intersect only aperture-non-formed portions therein.

3. The method according to claim 2, wherein said step (e) includes coiling the rolled electrode sheet fragment into a spiral form.

4. The method according to claim 2, further including the step of:

(f) piling the rolled electrode sheet fragment on a second electrode sheet fragment via a separator; and wherein said step (e) includes coiling the rolled electrode sheet fragment together with the separator and the second electrode sheet fragment.

5. The method according to claim 4, wherein said step (e) includes coiling the rolled electrode sheet fragment into a spiral form, together with the second electrode sheet fragment piled on the rolled electrode sheet fragment via the separator.

6. The method according to claim 2, wherein the filled aperture-formed portions of the electrode sheet fragments have a higher bending strength than the aperture-non-formed portions thereof.

7. The method according to claim 1, wherein said punched metal sheet has a first axis and a second axis perpendicular to the first axis, and said punched metal sheet has aperture-formed portions and aperture-non-formed portions therein, and wherein said step (a) includes causing the punched metal sheet to run in a direction parallel to the first axis of the punched metal sheet, the punched metal sheet having an aperture array arrangement such that any given line running along the punched metal sheet parallel to the second axis of the punched metal sheet will intersect aperture-formed portions therein;

wherein said step (b) includes causing the punched metal sheet, to which the slurry has been adhered, to run in a drying furnace, to thereby obtain the electrode sheet, the electrode sheet having substantially the same aperture array arrangement as the punched metal sheet;

wherein said step (c) includes cutting the electrode sheet in a cutting direction parallel to an axis of the electrode sheet which corresponds to the second axis of the punched metal sheet; and wherein the rolling direction in said step (d) is the same as the cutting direction.

8. The method according to claim 7, wherein the aperture array arrangement of the punched metal sheet is such that there exist given lines running along the punched metal sheet parallel to the first axis of the punched metal sheet which intersect only aperture-non-formed portions therein.

9. The method according to claim 8, wherein said step (e) includes coiling the rolled electrode sheet fragment into a spiral form.

10. The method according to claim 8, further including the step of:

(f) piling the rolled electrode sheet fragment on a second electrode sheet fragment via a separator; and wherein said step (e) includes coiling the rolled electrode sheet fragment together with the separator and the second electrode sheet fragment.

11. The method according to claim 10, wherein said step (e) includes coiling the rolled electrode sheet fragment into a spiral form, together with the second electrode sheet fragment piled on the rolled electrode sheet fragment via the separator.

12. The method according to claim 8, wherein the filled aperture-formed portions of the electrode sheet fragments have a higher bending strength than the aperture-non-formed portions thereof.

13. The method according to claim 7, wherein said step (e) includes coiling the rolled electrode sheet fragment into a spiral form.

14. The method according to claim 7, further including the step of:

(f) piling the rolled electrode sheet fragment on a second electrode sheet fragment via a separator; and wherein said step (e) includes coiling the rolled electrode sheet fragment together with the separator and the second electrode sheet fragment.

15. The method according to claim 14, wherein said step (e) includes coiling the rolled electrode sheet fragment into a spiral form, together with the second electrode sheet fragment piled on the rolled electrode sheet fragment via the separator.

16. The method according to claim 7, wherein the filled aperture-formed portions of the electrode sheet fragments have a higher bending strength than the aperture-non-formed portions thereof.

17. The metal according to claim 1, wherein said step (e) includes coiling the rolled electrode sheet fragment into a spiral form.

18. The method according to claim 1, further including the step of:

(f) piling the rolled electrode sheet fragment on a second electrode sheet fragment via a separator; and wherein said step (e) includes coiling the rolled electrode sheet fragment together with the separator and the second electrode sheet fragment.

19. The method according to claim 18, wherein said step (e) includes coiling the rolled electrode sheet fragment into a spiral form, together with the second electrode sheet fragment piled on the rolled electrode sheet fragment via the separator.

20. The method according to claim 1, wherein the filled aperture-formed portions of the electrode sheet fragments have a higher bending strength than the aperture-non-formed portions thereof.

* * * * *